(12) United States Patent
Kovacic et al.

(10) Patent No.: US 10,454,532 B2
(45) Date of Patent: Oct. 22, 2019

(54) METHOD AND TRANSMITTER CIRCUIT FOR COMMUNICATION USING ACTIVE LOAD MODULATION IN RADIO FREQUENCY IDENTIFICATION SYSTEMS

(71) Applicant: STMicroelectronics International N.V., Schiphol (NL)

(72) Inventors: Kosta Kovacic, Orehova Vas (SI); Albin Pevec, Ljubljana (SI)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 15/757,771

(22) PCT Filed: Sep. 21, 2016

(86) PCT No.: PCT/EP2016/072410
§ 371 (c)(1),
(2) Date: Mar. 6, 2018

(87) PCT Pub. No.: WO2017/050818
PCT Pub. Date: Mar. 30, 2017

(65) Prior Publication Data
US 2019/0036568 A1    Jan. 31, 2019

(30) Foreign Application Priority Data
Sep. 21, 2015   (EP) .................................. 15186078

(51) Int. Cl.
| | |
|---|---|
| *H04B 5/00* | (2006.01) |
| *G06K 7/10* | (2006.01) |
| *H04W 4/80* | (2018.01) |
| *H04B 1/04* | (2006.01) |
| *H04L 27/04* | (2006.01) |

(52) U.S. Cl.
CPC ....... *H04B 5/0062* (2013.01); *G06K 7/10366* (2013.01); *H04B 1/04* (2013.01); *H04B 5/0031* (2013.01); *H04L 27/04* (2013.01); *H04W 4/80* (2018.02)

(58) Field of Classification Search
CPC ......... H04B 1/04; H04B 5/0062; H04W 4/80; H04L 27/04; G06K 7/10366
USPC ...................................................... 455/41.1
See application file for complete search history.

(56) References Cited

U.S. PATENT DOCUMENTS

| | | |
|---|---|---|
| 2009/0134979 A1 | 5/2009 | Tsukamoto et al. |
| 2013/0288599 A1 | 10/2013 | Bernard et al. |
| 2014/0378053 A1 | 12/2014 | Clarke |

FOREIGN PATENT DOCUMENTS

| | | | | |
|---|---|---|---|---|
| WO | WO-2015003870 A1 | * | 1/2015 | ......... G06K 19/0715 |
| WO | WO-2015036682 A1 | | 3/2015 | |

OTHER PUBLICATIONS

International Search Report and Written Opinion for PCT/EP2016/072410 dated Nov. 3, 2016 (12 pages).

* cited by examiner

*Primary Examiner* — Lee Nguyen
(74) *Attorney, Agent, or Firm* — Crowe & Dunlevy (57) ABSTRACT

When communicating using active load modulation in a Radio Frequency Identification (RFID) system, a carrier signal having a carrier frequency is received from a reader device. In response, a modulated signal is generated and a burst of a sending signal is transmitted. The sending signal is decayed at the end of the burst.

16 Claims, 9 Drawing Sheets

METHOD AND TRANSMITTER CIRCUIT FOR COMMUNICATION USING ACTIVE LOAD MODULATION IN RADIO FREQUENCY IDENTIFICATION SYSTEMS

CROSS REFERENCE TO RELATED APPLICATIONS

This application is a 371 filing from PCT/EP2016/072410 filed Sep. 21, 2016 which claims priority from European Application for Patent No. 15186078.0 filed Sep. 21, 2015, the disclosures of which are incorporated herein by reference.

TECHNICAL FIELD

The application is directed to a method and transmitter circuit for communication using active load modulation in Radio Frequency Identification, RFID, systems.

BACKGROUND

Especially, the field of the application is RFID systems operating at 13.56 MHz which is usually referred to as high frequency RFID, HF RFID. Communication in these systems is achieved by magnetic or inductive coupling between an RFID reader coil and an RFID tag coil. Traditionally, RFID tags are passive devices. They are usually composed of an integrated circuit, IC, and a coil which is attached to its terminals. Together with an integrated capacitor, this coil forms a resonant circuit with a resonance close to 13.56 MHz. Since passive RFID tags do not contain a power source, the reader magnetic field is not only used to send data to a tag, but also provides a power supply to the RFID tag. However, the tag cannot reply to a reader by an active transmission since the induced power is not sufficient. Therefore, a state of the art passive RFID tag communicates to RFID readers by switching on and off a load connected in parallel to its coil by means of a so-called modulator switch. The term load modulation is usually used for this kind of communication. A standard that is commonly used in this communication is ISO/IEC 14443. The operating range of HF RFID systems varies from a few cm up to 1 m, depending on the protocol used and power emitted by the reader. The operating range of systems according to ISO 14443 standard, which are the most widely used HF RFID systems, is up to 10 cm using credit card size RFID tags. Such systems are used for contactless payment, ticketing, access control and similar applications.

The physical properties of HF RFID systems are such that the range in which conventional tags are supplied and the range in which the reader can detect a signal produced by load modulation are approximately the same. This means that the range of a tag to reader communication cannot be significantly improved even if an external power supply is provided to an RFID tag.

There is a strong demand on the market to implement RFID tags with very small dimensions. A typical application is integrating RFID tag functionality in a mobile phone, either as an imbedded application having a small antenna or in a card which is inserted in the phone, e.g. a micro SD card or a SIM card. In these applications, the size of the RFID tag antenna is so small that the use of a passive RFID tag IC results in the best case in a very short operating range. As mentioned before, the solution to increase the operating range is to provide a power supply and replace load modulation by another technology that increases the communication range in the direction tag to reader. One possibility is to replace load modulation by an active transmission. Active Load Modulation, ALM, is the term used for this type of modulation.

To generate a tag reply, ALM devices generate a signal synchronous to the incoming field frequency received from a reader. The signal to be transmitted is generated by means of a digital amplitude modulation, also known as amplitude shift keying, using a subcarrier signal. Two different types of transmission are possible: According to a first type, transmission is only active during the time that the modulator switch would be turned on in a passive load modulation device. In the case of ISO 14443 standard, this is equivalent to a first half of a subcarrier period. In the second type transmission is active in both parts of the tag reply, the part when the modulator switch of a passive load modulation device would be turned on and the part when it would be turned off. During the time the modulator switch would be turned off, a signal is sent in opposite phase compared to the signal received from the reader. In the ISO/IEC 14443 standard, this is equivalent to sending a signal in the opposite phase during the second half of the subcarrier period.

Both transmission techniques listed above are described, for example, in the ISO contribution tf2n723_Active_Transmission_PICC_to_PCD. Different terminology is used to refer to the two modes. In the present application the expression AND TX mode is used for transmission only during the first half of the subcarrier period, i.e. the first type described above, and the expression XOR TX mode is used for the second type described above.

XOR TX mode generates twice as much signal on an RFID reader as AND TX mode during the same period of time, because in XOR TX mode the signal is sent in opposite phase while in AND TX mode there is no transmission. Therefore, XOR TX mode is generally employed in applications where signals generated in AND TX mode are not strong enough or in case the operating range needs to be increased.

Both the AND and XOR TX modes can be used to implement the ISO/IEC 14443A with a bit rate of 106 kbps which uses Manchester coding.

Figure 1:
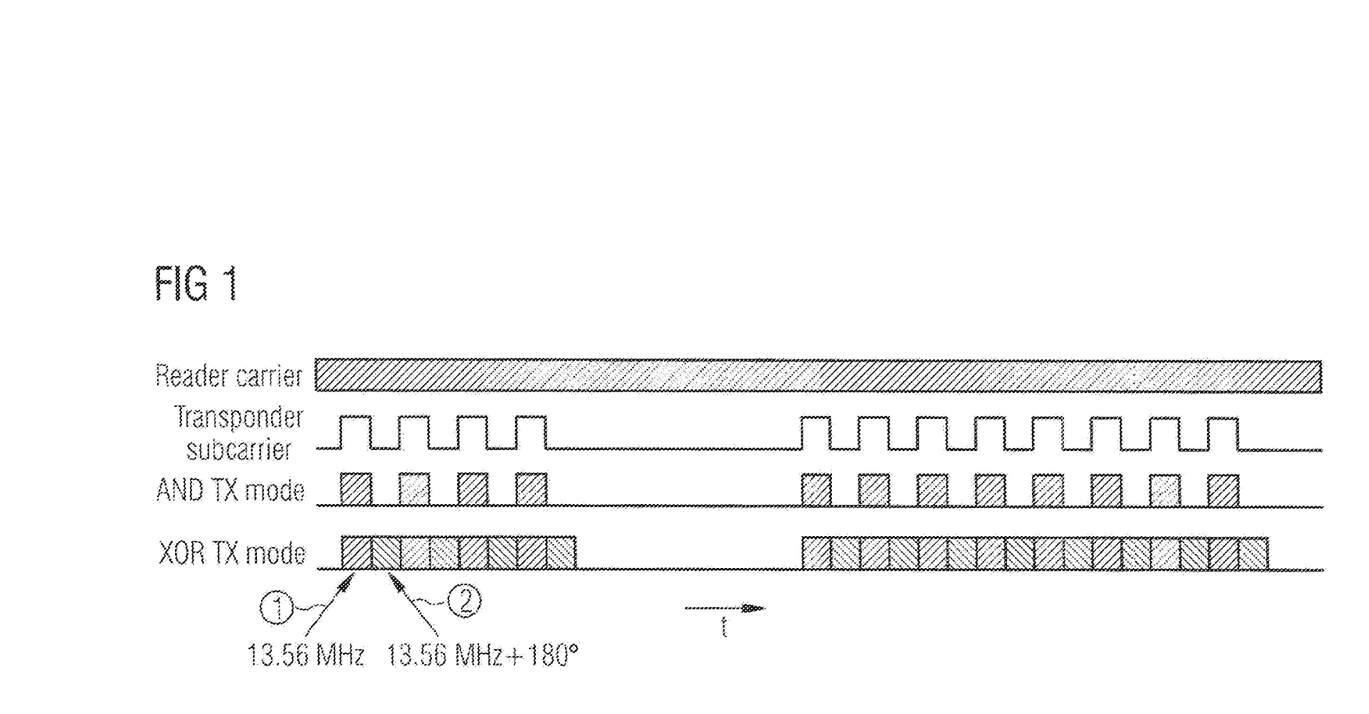
FIG. 1 shows signals according to ISO 14443A.

Corresponding signals are depicted in FIG. 1. The first line shows a signal received from a reader device, the signal being denoted reader carrier. It has a carrier frequency which in the case of ISO 14443 is 13.56 MHz. This signal is also called the incoming field. The second line shows a transponder subcarrier signal which comprises data to be sent to the reader which has been coded with the required code according to ISO 14443, e.g. Manchester code, and modulated with the subcarrier signal. The third line depicts the signal which is transmitted in AND TX mode, wherein the carrier is transmitted only during impulses of the transponder subcarrier. The fourth line shows the signal which is transmitted in XOR TX mode in which the carrier is transmitted during impulses of the transponder subcarrier marked with 1 and a carrier with opposite phase is transmitted in pauses between two impulses of the transponder subcarrier marked with 2 and hatched in the opposite direction when compared with the parts marked with 1.

The above explanation also applies to near-field communication, NFC, technology, specifically for passive peer-to-peer communication mode and for card emulation mode which re-use the ISO 14443 standard. In NFC technology, the term target is used instead of transponder or tag.

Figure 2:
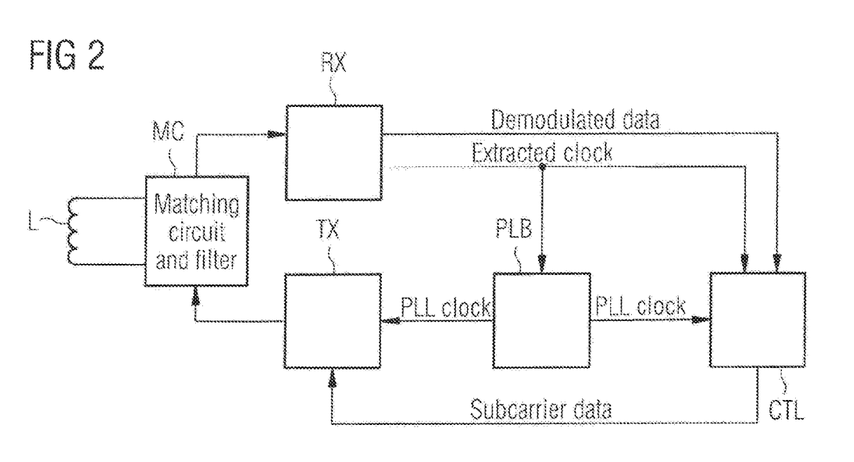
FIG. 2 shows a block diagram of a typical state of the art ALM device.

FIG. 2 shows a block diagram of a typical state of the art ALM device which can be a transponder or an NFC controller. The main building blocks are an antenna L connected to a matching circuit MC and an IC. The IC incorporates a receiver RX with a gain stage, a demodulator, a clock extractor functionality, a data slicer functionality, a phase-locked loop, PLL, block PLB with a phase detector, a loop filter and a voltage-controlled oscillator, VCO, functionality, a control circuit CTL and a transmitter TX, with a regulator and a driver functionality. The control circuit CTL can be, for instance, the complete digital circuit of an NFC controller.

As known to those skilled in the art, the depicted ALM device operates basically according to the following: A signal sent by a reader is detected by the antenna L and filtered in the matching circuit MC. It is passed to the receiver RX which demodulates the data and extracts a clock signal therefrom. Both signals are propagated to the control circuit CTL. During reception, the PLL inside the PLL block PLB is locked to the extracted clock. When the transmitter TX is active for sending data to the reader, the PLL loop is open and the VCO continues to operate with the phase which was established during receiving. The resulting PLL clock is provided to the transmitter TX and the control circuit CTL. The control circuit generates a subcarrier signal by dividing the PLL clock and modulates data to be sent with the subcarrier. The resulting subcarrier data is propagated to the transmitter TX which therefrom generates signals to be transmitted using the PLL clock. Tor transmission these signals are passed through the matching circuit MC to the antenna L.

It has turned out that the known solutions of ALM devices using XOR TX mode for implementing the ISO 14443A 106 kbps protocol have the problem that at the end of the counter-phase carrier transmission the strong modulation signal on the reader antenna, caused by the transponder active transmission, does not stop immediately. This entails a demodulator or data slicer on the reader side to produce more pulses than there actually are. In the worst case, this will cause an error in the data frame and the communication will need to be restarted, or else the frame will need to be resent if some kind of error handling is implemented. However, because the error is caused systematically, it is hard to establish a reliable communication and the user possibly needs to re-align the transponder or mobile phone with integrated transponder closer or further away from the reader antenna.

Figure 3:
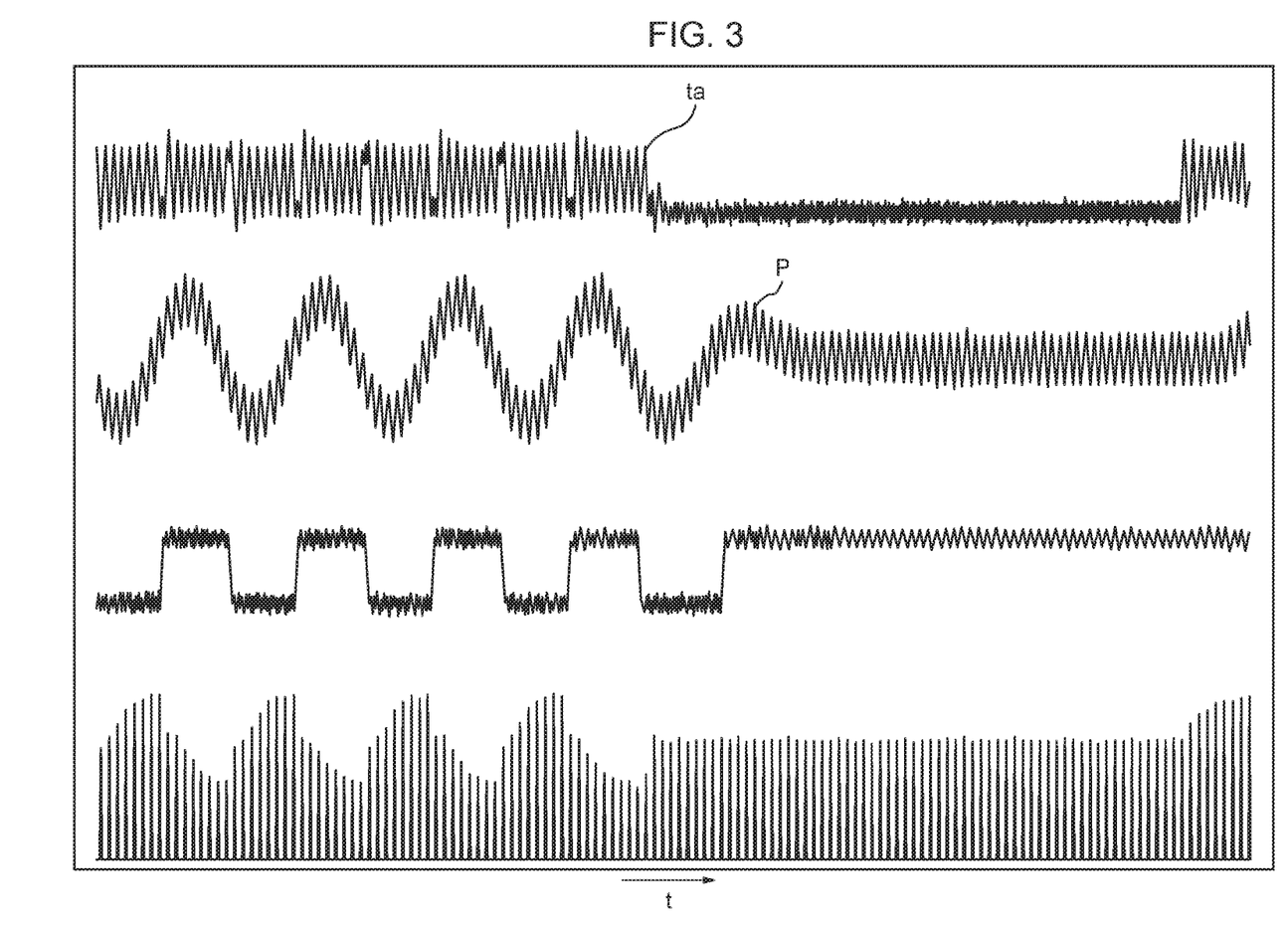
FIG. 3 shows signals of an RFID communication according to the state of the art in an oscilloscope screenshot.

FIG. 3 shows an oscilloscope screenshot of an RFID communication according to the state of the art which has the above mentioned problem. The screenshot shows a detail of a transponder frame in reply to a reader command at the point in time where the carrier transmission is stopped which in this case is after there is no subcarrier pulse for nine carrier clocks. In the first line the screenshot is showing the transmit signal of the transponder which is using ALM and XOR TX mode for the case of ISO 14443A 106 kbps. The second line shows an analog received signal on the reader side. The third line shows the corresponding digitized signal on the reader side. The fourth line shows the RF field between the reader and the tag measured with a so-called spy coil.

One can see that although the transponder transmission in the first line is already stopped at a point in time ta, the analog and digital signal in second and third lines are still ringing which causes an additional pulse P in the digital signal on the output of a data slicer of the reader. Said unintended additional pulse P may cause an error in the receipt of data on the side of the reader.

There is accordingly a need in the art to provide a method and a transmitter circuit for communication using active load modulation in RFID systems which avoid errors on the side of a reader caused by XOR TX mode active load modulation.

SUMMARY

In one embodiment a method for communication using active load modulation in RFID systems comprises the following steps:
receiving a carrier signal having a carrier frequency from a reader device,
generating a modulated signal which is synchronized to the carrier signal,
transmitting a burst of a sending signal, the sending signal being a function of the modulated signal, and
decaying the sending signal at the end of the burst.

Upon receiving the carrier signal sent out by the reader device, a modulated signal is actively generated and transmitted as the sending signal in the form of the burst. At the end of the transmission of the burst, the transmission is not promptly stopped or interrupted, but instead the sending signal is sent in a decayed form.

The decaying sending signal causes less modulation signal on an antenna of the reader device. In this way, a ringing on reader device's antenna is reduced. Receiving errors on the reader device's side are avoided.

In one development the decaying comprises reducing an amplitude of the sending signal according to an adjustable slope during an adjustable time.

In this embodiment a decaying of the sending signal at the end of the burst is achieved by continuously reducing the sending signal's amplitude. The slope and time of the decaying can be adjusted, for instance by programming. Thereby, an optimum between a small modulation signal on the reader device which prevents errors in the receiving and the time which is available for the decaying can be achieved.

In an alternative embodiment the decaying comprises reducing a length of the sending signal by suppressing transmission of a last phase of the sending signal.

In this alternative the decaying is accomplished by shortening the length of the sending signal. The last phase of the sending signal which does not contain data is skipped. As a consequence, on the side of the reader device no receiving error occurs.

The reader device comprises a state of the art RFID reader which implements preferably the protocols defined in ISO 14443.

In one embodiment the generation of the modulated signal is achieved by a digital amplitude modulation of a subcarrier signal with a data signal and a reproduced carrier signal. The data signal has the data to be sent to the reader device. The subcarrier signal has a frequency which is an integer divider of the carrier frequency. The reproduced carrier signal is synchronous in frequency and phase to the carrier signal.

The reproduced carrier signal is obtained from the incoming carrier signal, preferably by extraction of a clock of the carrier signal or by a local oscillator which is tuned to the frequency of the carrier signal and by subsequent synchronization of frequency and phase of the extracted clock or oscillator signal e.g. by means of a phase-locked loop. Generally, the data to be sent is coded according to, for example, a Manchester code. The digital amplitude modulation is also called amplitude shift keying, ASK.

The generation of the modulated signal is the active load modulation, ALM, used in RFID systems for enlarging the range of the communication as known to those skilled in the art.

In a further development transmitting the sending signal comprises emitting the modulated signal during a first half of a period of the subcarrier signal and emitting an inversed carrier signal during a second half of the period of the subcarrier signal. A phase of the inversed carrier signal is inverse to a phase of the reproduced carrier signal.

As defined in the ISO 14443 protocol, pulses of the modulated signal are emitted during the first half of the subcarrier signal. In the pauses between these pulses, i.e. during the second half of the subcarrier signal, the inversed carrier signal is emitted. The phase of the inversed carrier signal is opposite to the phase of the reproduced carrier signal and thereby is in counter-phase or shifted by 180° with respect to the phase of the carrier signal emitted by the reader device.

Consequently, in the alternative in which the amplitude of the sending signal is decayed, at the end of the burst of the sending signal, the inversed carrier is emitted and its amplitude is reduced according to the desired slope and programmed time.

In the second alternative in which the transmission of the last half period of the sending signal is suppressed, emission of the inversed carrier signal during the last period of the subcarrier signal is skipped. In this case, transmission stops after emission of the modulated signal during the first half of the period of the subcarrier signal.

The described transmission of the sending signal complies with the above-described XOR TX mode as known to those skilled in the art.

In one embodiment the burst of the sending signal comprises at least one bit of data.

The burst is the time during which pulses occur in the modulated signal. This time also depends on the coding of the data to be sent. The present application aims at the ISO 14443A which implements the bitrate of 106 kbits per second. This variant uses a subcarrier with a frequency of 846.5 KHz and employs Manchester coding for the data. Each bit has a length of 8 subcarrier signal periods. Following the Manchester code, a zero bit is coded by a period of silence during the first half bit period, followed by four subcarrier pulses. A one bit is represented by four subcarrier pulses in the first half bit period followed by silence during the second half bit period. Therefore, the burst has at least four subcarrier pulses corresponding to a zero or a one bit. In case the data bit is changed, for instance when a one bit follows a zero bit, the burst has eight subcarriers corresponding to two bits.

In a development the method further comprises, after decaying the sending signal, synchronizing to the carrier signal while not transmitting the sending signal.

After the sending signal has been decayed to zero, a resynchronization to the carrier signal sent out by the reader device is effected before transmission of a next burst of the sending signal.

In detail, the phase of the reproduced carrier signal is resynchronized. For example, the PLL as described above locks to the received carrier signal.

The method enhances interoperability with existing readers when using the XOR TX mode for implementing the ISO 14443A 106 Kbit per second protocol.

In one embodiment a transmitter circuit for communication using active load modulation in RFID systems comprises an equipment for generating a decaying sending signal.

Due to the equipment for generating the decaying sending signal, the transmitter circuit is enabled to communicate with a reader device by means of active load modulation without producing errors on the side of the reader device.

The transmitter circuit when used in an ALM device as described above, implements any of the embodiments of the method proposed above.

In one development the equipment comprises a control circuit which is prepared for reducing a length of the sending signal by suppressing transmission of a last half period of the sending signal.

In an alternative embodiment the equipment comprises a digital-to-analog converter which is prepared to provide a reference voltage with a decaying amplitude to a regulator circuit in the transmitter circuit.

In order to reduce the amplitude of the sending signal, the analog-to-digital converter of the transmitter circuit is used and the amplitude of the reference voltage which is provided by the analog-to-digital converter is decayed over a programmable time according to an adjustable slope.

In still another alternative, the equipment comprises a regulator circuit. The regulator circuit has a first input for supplying a reference voltage, a second input for supplying a supply voltage and an output for providing a regulated voltage to an electrical load within the transmitter circuit. A decoupling capacitor can be connected to the output. The regulator circuit further has a first transistor, a comparator and a first switch. The first transistor has a controlled section which is coupled between the second input and the output of the regulator circuit. The comparator has a first input to receive the reference voltage, a second input to receive a feedback voltage dependent on the regulated voltage and an output for providing a voltage. This voltage is provided as a function of a difference between the reference voltage and the feedback voltage. The first switch is coupled to a control input of the first transistor in order to connect either the output of the comparator or the second input of the regulator circuit to the control input of the first transistor. Therein, the first switch is controlled such that the first transistor is either switched on and the regulated voltage is supplied as a function of the reference voltage, or the first transistor is switched off and an amplitude of the regulated voltage decays according to an adjustable slope during an adjustable time.

In order to generate the decaying of the sending signal, the first transistor is switched off so that current cannot flow from a power supply into the regulator circuit or in backward direction. An RF driver connected downstream to the regulator circuit is left active. Therefore, the amplitude of the regulated voltage at the output of the regulator circuit drops.

In a development the slope of the regulated voltage is adjustable as a function of the decoupling capacitor and an electrical load of the regulator circuit.

The RF driver connecting downstream to the regulator circuit is one example of said electric load. As long as this driver is left active, the slope with which the regulated voltage decreases depends on the load represented by the driver and the size of the decoupling capacitor. The slope is adjustable by selection of a size of capacitance of the decoupling capacitor with respect to the driver load.

In a further development the regulator circuit additionally comprises a resistor divider having a serial connection of a first and a second resistor. The resistor divider is coupled between the output of the regulator circuit and a reference potential terminal. The feedback voltage is provided at a connection point between the first and the second resistor.

In another development the regulator circuit further comprises a charging circuit which is coupled between the second input and the output of the regulator circuit. The charging circuit is prepared for recharging the output of the regulator circuit after completion of the generation of the decaying sending signal.

After the amplitude of the regulated voltage has decreased to approximately 0 V, the output of the regulator circuit, namely, the decoupling capacitor, has to be recharged. The recharging is controlled such that a flow of high current from the supply at the first input to the output of the regulator circuit is avoided. Typically, this charging is accomplished during the resynchronization to the carrier signal as described above.

In another development the charging circuit comprises a second transistor, a second switch and a third resistor. The second transistor has a controlled section which is coupled on one side to the second input and on the other side to the output of the regulator circuit via the third resistor. The second transistor has a control input which is connected to the second switch. The second switch is prepared to connect either the output of the comparator or the second input of the regulator circuit to the control input of the second transistor such that the second transistor is turned off concurrently with turning off the first transistor and that the second transistor is turned on shortly before turning on the first transistor.

Due to the third resistor, charging of the output of the regulator circuit is accomplished with a higher resistance according to a charge up with limited current.

In an exemplary implementation, the first transistor is turned on approximately two clocks of the reproduced carrier signal after the second transistor has been turned on. This time difference amounts to approximately 115 nanoseconds.

BRIEF DESCRIPTION OF THE DRAWINGS

The text below explains the proposed principle in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures.

DETAILED DESCRIPTION

The definitions as described above also apply to the description of the below embodiments unless stated otherwise.

Figure 4:
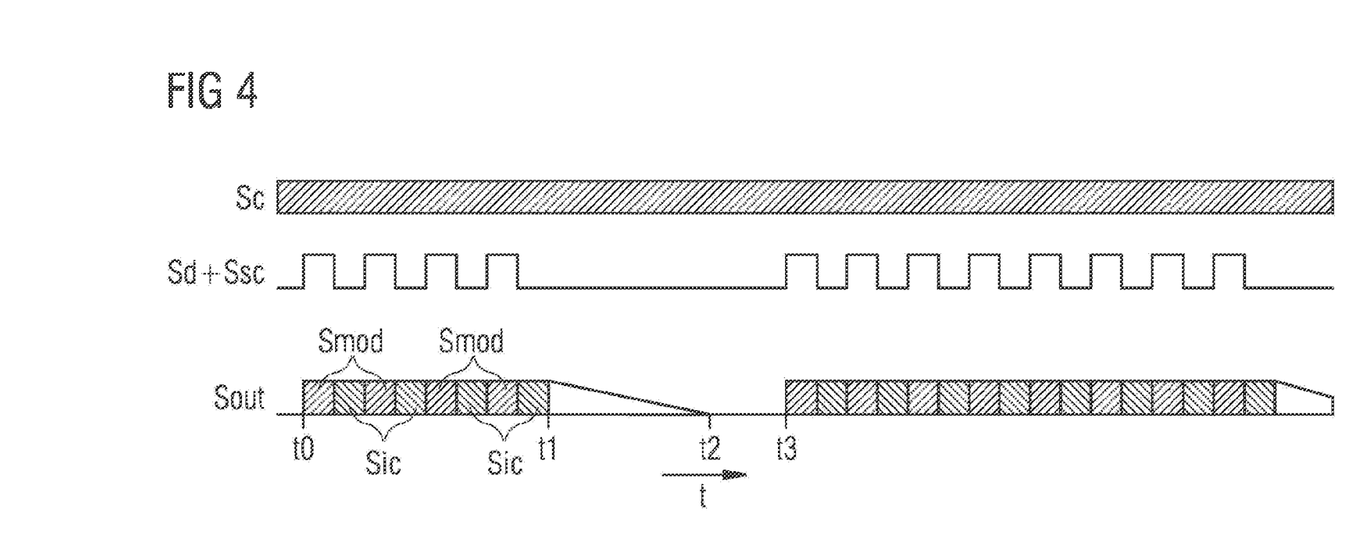
FIG. 4 shows signals of an RFID communication according to a first embodiment of the proposed method.

FIG. 4 shows signals of an RFID communication according to a first embodiment of the proposed method.

Different signals are depicted, each with reference to time t. The first line shows a carrier signal Sc. The second line shows a modulation of a data signal Sd with a subcarrier signal Ssc. The third line shows a sending signal Sout.

The carrier signal Sc is sent out by a reader device by means of emission of an electromagnetic field. It has a carrier frequency which amounts to, for example, 13.56 MHz according to the standard ISO 14443 A. The data signal Sd transports the data to be sent to the reader device. Here, the data is coded according to Manchester code. In the second line the data signal Sd is already modulated with the subcarrier signal Ssc.

The sending signal Sout comprises a modulated signal Smod and an inversed carrier signal Sic. The modulated signal Smod is achieved by modulating the data signal Sd and the subcarrier signal Ssc as depicted in the second line with the reproduced carrier signal Src. The modulated signal Smod is synchronous in phase and frequency to the carrier signal Sc which is marked by hatching in the same direction as the carrier signal Sc. In between two impulses of the subcarrier plus data signal Ssc+Sd the inversed carrier signal Sic is transmitted in the sending signal Sout. Portions of the inversed carrier signal Sic are hatched in an opposite direction compared with the hatching of the carrier signal Sc to highlight that the inversed carrier signal Sic is sent in opposite phase with respect to the phase of the carrier signal Sc.

It can be discerned that a burst of the sending signal Sout starts at point in time t0 and ends at point in time t1. It has four half periods of the subcarrier signal Ssc with the modulated signal Smod and four periods which amount to half the period of the subcarrier signal Ssc and represent the second half of this period where the inversed carrier signal Sic is transmitted. This represents the emission of a bit with the value 1, for example.

Point in time t1 marks the end of the burst at which a continuous decaying of the amplitude of the sending signal Sout starts. At point in time t2 the amplitude of the sending signal Sout has reached approximately 0 V. Subsequently, a period of silence follows in which no signals are transmitted from the transponder or ALM device to the reader device. In this time the transponder's PLL resynchronizes to the frequency and phase of the carrier signal Sc. At a point in time t3 the silence period ends and transmission of the next burst starts.

It can be seen that the second burst has a length of 8 subcarrier pulses corresponding to two data bits. This is due to the Manchester code and a change of bits value from 0 to 1 to 1 to 0. Once again the second burst has half periods of the modulated signal Smod interleaved with half periods of the inversed carrier signal Sic according to the XOR TX mode of an active load modulation.

The time between points in time t1 and t3 in which no data is sent amounts to 64 pulses of the carrier signal Sc. Typically, 8 to 16 carrier pulses are needed for resynchronizing to the carrier signal Sc between points in time t2 and t3. The remaining number of carrier pulses represent the amount of time between points in time t1 and t2 can be used for defining the slope for the decaying sending signal Sout. The period between points in time t1 and t2 is denoted the decaying period. It has typically a duration of 32 to 48 pulses of the carrier signal Sc.

The end of the burst is also marked by the absence of the subcarrier plus data signal Ssc+Sd during at least nine pulses of the carrier signal Sc.

By reducing the amplitude of the sending signal Sout gradually, a ringing on the side of the reader device can be avoided. Occurrence of receiving errors due to this ringing is prevented and interoperability with existing readers is greatly enhanced.

Figure 5:
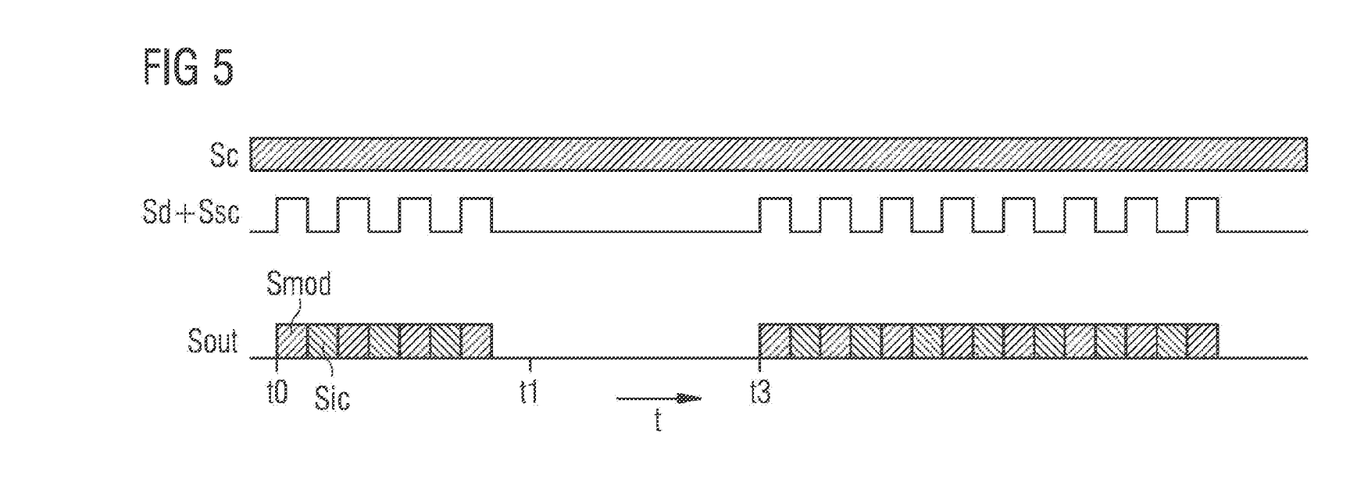
FIG. 5 shows signals of an RFID communication according to a second embodiment of the proposed method.

FIG. 5 shows signals of an RFID communication according to a second embodiment of the proposed method. This figure shows the same signals as FIG. 4. However, it can be seen that transmission stops after the last impulse of the modulated signal Smod. A last period of the inversed carrier signal Sic which would occur in state of the art XOR TX mode is skipped. This also prevents errors during receiving on the side of the reader device which enhances interoperability with existing reader devices.

As the transmission is shorter, the ringing on the reader side does not cause an error in reader receiving.

Figure 6:
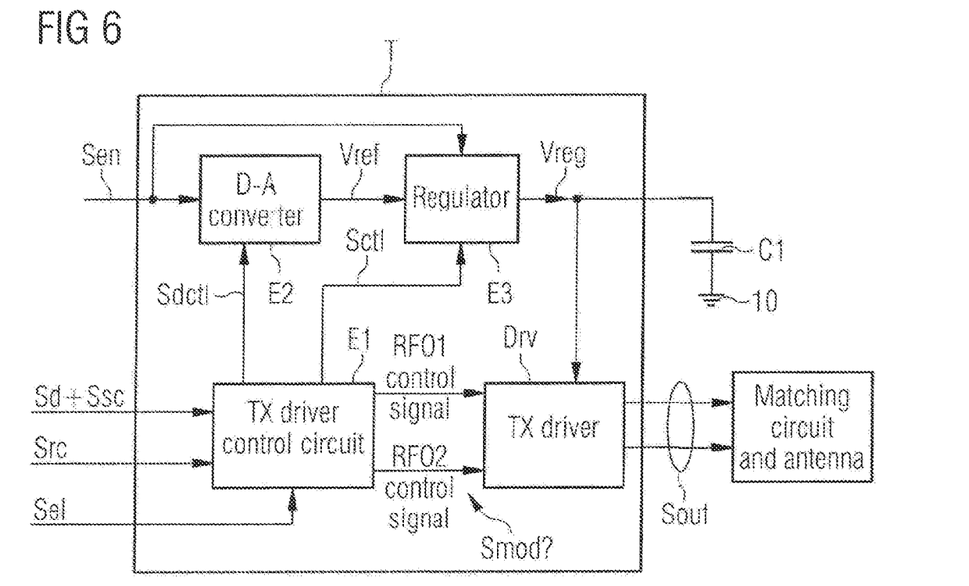
FIG. 6 shows an exemplary embodiment of a transmitter circuit according to the proposed principle.

FIG. 6 shows an exemplary embodiment of a transmitter circuit according to the proposed principle. This transmitter circuit T represents an implementation example for the different methods proposed in this application for achieving interoperability with existing reader device infrastructure when using active load modulation according to ISO 14443 A with a bit rate of 106 Kbit/s using the XOR TX mode. The depicted transmitter circuit T can be used in an ALM device as shown in FIG. 2 instead of the state of the art transmitter TX.

For all possibilities described above, the transmitter circuit T comprises an equipment E1, E2, E3 for generating the decaying sending signal Sout. Besides the different equipment E1, E2 and E3 in all the below described possibilities the transmitter circuit T has a driver component Drv which provides the sending signal Sout to a state of the art matching circuit and antenna as can be seen e.g. in FIG. 2.

Furthermore, the transmitter circuit T has input terminals for receiving an enabling signal Sen, the subcarrier signal modulated with the data signal Ssc+Sd, the reproduced carrier signal Src and a selection signal Sel. The enabling signal Sen serves for activating the transmitter circuit T. The selection signal Sel comprises information about the protocol currently used in the ALM device, for instance the ISO 14443 A protocol with the 106 Kbit per second rate.

The transmitter circuit T further comprises a control circuit which is reused for implementing the first possibility as equipment E1, a digital-to-analog converter which is reused to implement the second possibility as equipment E2 and a regulator circuit which is reused for implementing a third possibility in the form of the equipment E3. In each of the possibilities to be described, one functional block implements one of the above-described methods, whereas the remaining functional blocks work according to their traditional functionality as known to those skilled in the art.

The control circuit E1 provides a first control signal Sdctl to the digital-to-analog converter, DAC, E2. The control circuit E1 further provides a second control circuit Sctl to the regulator circuit E3. The DAC E2 provides a reference voltage Vref to the regulator circuit E3. The regulator circuit E3 provides a regulated voltage Vreg as a function of the reference voltage Vref. The regulated voltage Vreg is provided to a decoupling capacitor C1 which can be connected externally to the transmitter circuit T. The decoupling capacitor C1 is connected with its second terminal to a reference potential terminal 10. The regulated voltage Vreg is also provided to the driver circuit Drv. The control circuit E1 implements the active load modulation and provision of the modulated signal Smod by modulating the data plus subcarrier signals Sd+Ssc onto the reproduced carrier signal Src. The driver circuit Drv provides the sending signal Sout using the regulated voltage Vreg and the signals provided by the control circuit E1.

According to the first possibility, the equipment E1 comprises a control circuit which is prepared for reducing a length of the sending signal Sout by suppressing transmission of a last half period of the sending signal Sout as described in FIG. 5. This is achieved by evaluating the selection signal Sel, as well as the data plus subcarrier signal Sd+Ssc.

According to the second possibility, the DAC E2 provides the reference voltage Vref with a decaying amplitude under the control of the control circuit E1 by means of the first control signal Sdctl.

According to the third possibility, the regulator circuit E3 provides the regulated voltage Vreg with a decaying amplitude under control of the control circuit E1 by means of the second control signal Sctl. The control circuit E1 ensures that in this possibility the DAC E2 works according to its traditional functionality and provides the reference voltage Vref with a stable amplitude. The regulator circuit E3 output is buffered with the decoupling capacitor C1. The driver circuit Drv is supplied with this buffered regulated voltage Vreg.

The DAC E2 can also be realized by a voltage reference or a band gap circuit. When not realizing the functionality according to the second possibility described above, the DAC E2 is used for generating the reference voltage Vref at different levels and by this achieving a controlled output power. In the third possibility the driver circuit Drv represents an electric load to the regulator circuit E3. In order to adjust the slope of the decaying amplitude of the regulated voltage Vreg, the capacitance value of the decoupling capacitor C1 is chosen in function of the electrical load represented by the driver circuit Drv.

Figure 7:
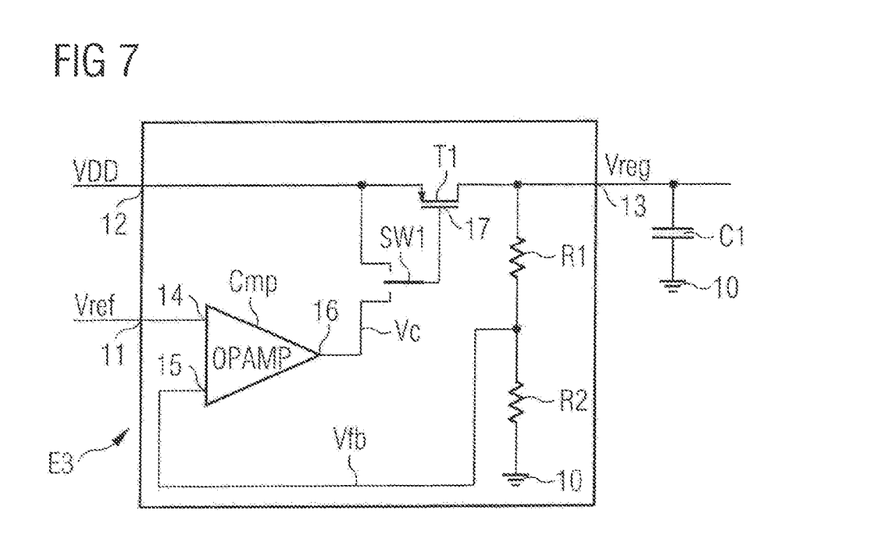
FIG. 7 shows a first exemplary embodiment of a regulator circuit according to the proposed principle.

FIG. 7 shows a first exemplary embodiment of a regulator circuit according to the proposed principle. The regulator circuit E3 is used in the transmitter circuit T of FIG. 6 when the third possibility is implemented. In an ALM transponder IC the regulator is normally used for output power control. The output power control can be either manual or it can be used in an automatic power control algorithm that automatically controls the power with respect to distance to the reader device.

The regulator circuit E3 comprises a first input 11 for supplying the reference voltage Vref which is received from the DAC as of FIG. 6. The regulator circuit E3 further has a second input 12 for supplying a supply voltage VDD, and an output 13 for providing the regulated voltage Vreg. The regulator circuit E3 also comprises a first transistor T1, a first switch SW1, a comparator Cmp and a resistor divider R1, R2. The first transistor T1 has a controlled section which is coupled between the second input 12 and the output 13. It also has a control input 17 which is connected via the first switch SW1 either to the second input 12 or to an output 16 of the comparator Cmp.

The comparator Cmp has a first input 14 which receives the reference voltage Vref and a second input 15 which receives a feedback voltage Vfb. The feedback voltage Vfb is a function of the regulated voltage Vreg and is provided by means of the resistor divider R1, R2. At the output 16 of the comparator Cmp a voltage Vc is provided depending on a difference between the reference voltage Vref and the feedback voltage Vfb. The resistor divider R1, R2 has a serial connection of a first and second resistor R1, R2. The first resistor R1 is coupled to the output 13 of the regulator circuit and to the second resistor R2. The second resistor R2 is coupled with its second terminal to the reference potential terminal 10. A connection point between first and second resistor R1, R2 provides the feedback voltage Vfb.

The first switch SW1 is controlled by the second control signal Sctl depicted in FIG. 6 such that the first transistor T1 is either switched on by connecting its control input 17 to the output 16 of the comparator Cmp. In this case, the regulated voltage Vreg is supplied as a function of the reference voltage Vref. Otherwise, the first transistor T1 is switched off by connecting its control input 17 to the second input 12 of the regulator circuit. In that case, the amplitude of the regulated voltage Vreg decays from its last value to approximately zero volts according to an adjustable slope during an adjustable time. The adjustment of slope and time is achieved by balancing the value of the decoupling capacitor C1 with respect to the electrical load of the regulator circuit as represented by the driver circuit Drv and subsequent matching circuit and antenna depicted in FIG. 6.

As the amplitude of the regulated voltage Vreg supplied to the driver circuit Drv is gradually reduced, the amplitude of the sending signal Sout of FIG. 6 also decays. By this, a ringing on the antenna of the side of the reader device is reduced and errors in receiving are prevented. Interoperability between active load modulation transponders using the ISO 14443 106 Kbit/s variant with XOR TX mode and existing reader device infrastructure is greatly enhanced.

In order to achieve different voltage ranges, first and second resistors R1, R2 can be composed of more segments and can also be variable resistors. The comparator Cmp can be realized by an operational amplifier. Instead of the reference voltage Vref provided by the DAC E2 of FIG. 6, another voltage reference may be used and supplied to the first input 14 of the comparator Cmp.

Figure 8:
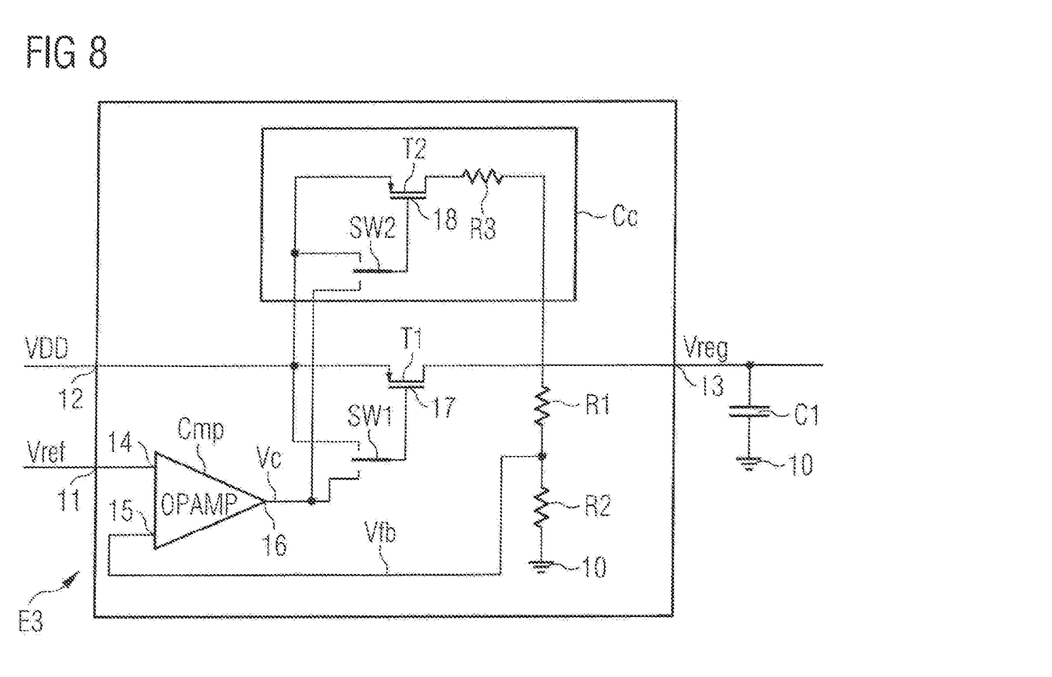
FIG. 8 shows a second exemplary embodiment of a regulator circuit according to the proposed principle.

FIG. 8 shows a second exemplary embodiment of a regulator circuit according to the proposed principle. This embodiment basically conforms to the embodiment depicted in FIG. 7. However, the present embodiment has additional components which are used for controlled charging of the output 13 of the regulator circuit E3 and the decoupling capacitor C1 after the amplitude of the regulated voltage Vreg has decayed 0 V. In addition to the components described under FIG. 7, the regulator circuit E3 in this embodiment comprises a charging circuit Cc with a second transistor T2, a second switch SW2 and a third resistor R3.

The second transistor T2 has a controlled section which is coupled on one side to the second input 12 of the regulator circuit E3 and on the other side to the output 13 of the regulator circuit via the third resistor R3. The second transistor T2 also has a control input 18 which is connected to the second switch SW2. Under control of the second control signal Sdctl described in FIG. 6, the second switch SW2 is prepared to connect either the output 16 of the comparator Cmp or the second input 12 of the regulator circuit to the control input of the second transistor T2.

Consequently, the second transistor T2 is controlled such it is switched off concurrently with the first transistor T1 during the period where the amplitude of the regulated voltage Vreg decays. Subsequently, at completion of the decaying, i.e. when the regulated voltage Vreg is at 0 V, the second transistor T2 is turned on first. After a defined amount of time, the first transistor T1 is switched on, as well. The defined amount of time is about two clocks of the reproduced carrier signal Src which amounts to approximately 115 nanoseconds.

The charging circuit Cc prevents the drawing of an excessive amount of current from the power supply VDD when charging up the output 13 of the regulator circuit. Preferably, the second transistor T2 is implemented by a PMOS transistor. The decoupling capacitor's C1 charging current is limited. The resistance of the third resistor R3 is selected such that the regulated voltage Vreg reaches its desired value before transmission of the next burst is started.

The charging circuit Cc can also be used for recharging the decoupling capacitor C1 in the second possibility described with reference to FIG. 6 where the DAC E2 is used to provide the reference voltage Vref with a decaying amplitude.

Figure 9:
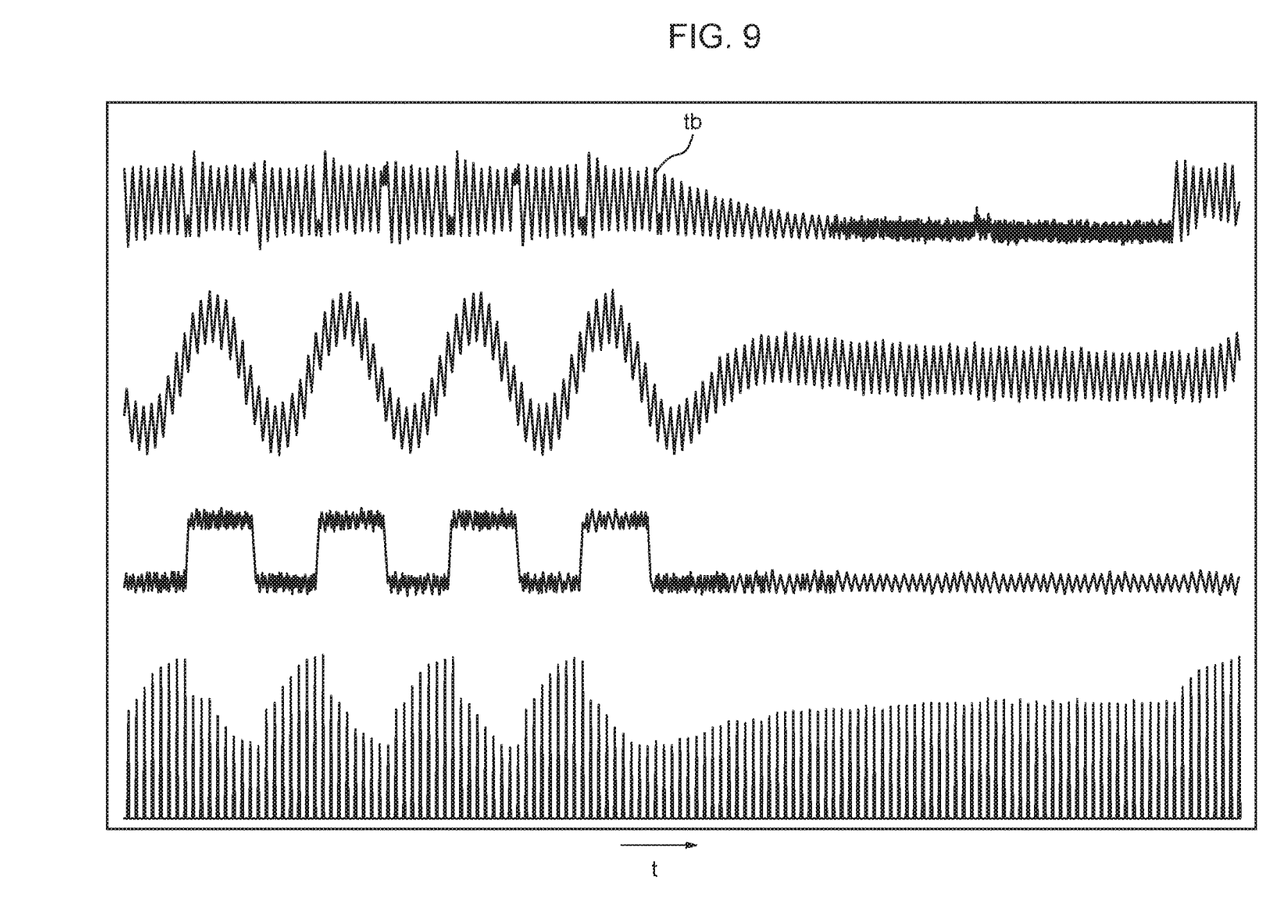
FIG. 9 shows signals of an RFID communication according to the embodiments of the present invention in an oscilloscope screenshot.

FIG. 9 shows signals of an RFID communication according to the embodiments of the present invention in an oscilloscope screenshot. The order of appearance of the signals in FIG. 9 corresponds to the order of appearance of the signals in FIG. 3. The oscilloscope screenshot of FIG. 9 refers to the second and third possibilities as described in FIG. 6.

The first line of the screenshot shows the sending signal Sout of a transponder reply at the end of the transmission burst provided according to the proposed method. The second line shows the analog signal on the reader's antenna. The third line depicts the digital signal on the reader side. The fourth line shows the RF field between reader device and transponder which is detected using a spy coil.

It can be seen that at the end of the burst at point in time tb, the amplitude of the inversed carrier signal which is sent out by the transponder with the sending signal Sout is decreasing. In the second and third lines one can see that no error occurs on the side of the reader device.

When comparing with FIG. 3, it can be discerned that the signal sent out by the transponder is received without errors by the reader device even when using the XOR TX mode. The additional impulse P which is detected erroneously in the state of the art as described with reference to FIG. 3 has disappeared in FIG. 9.

Figure 10:
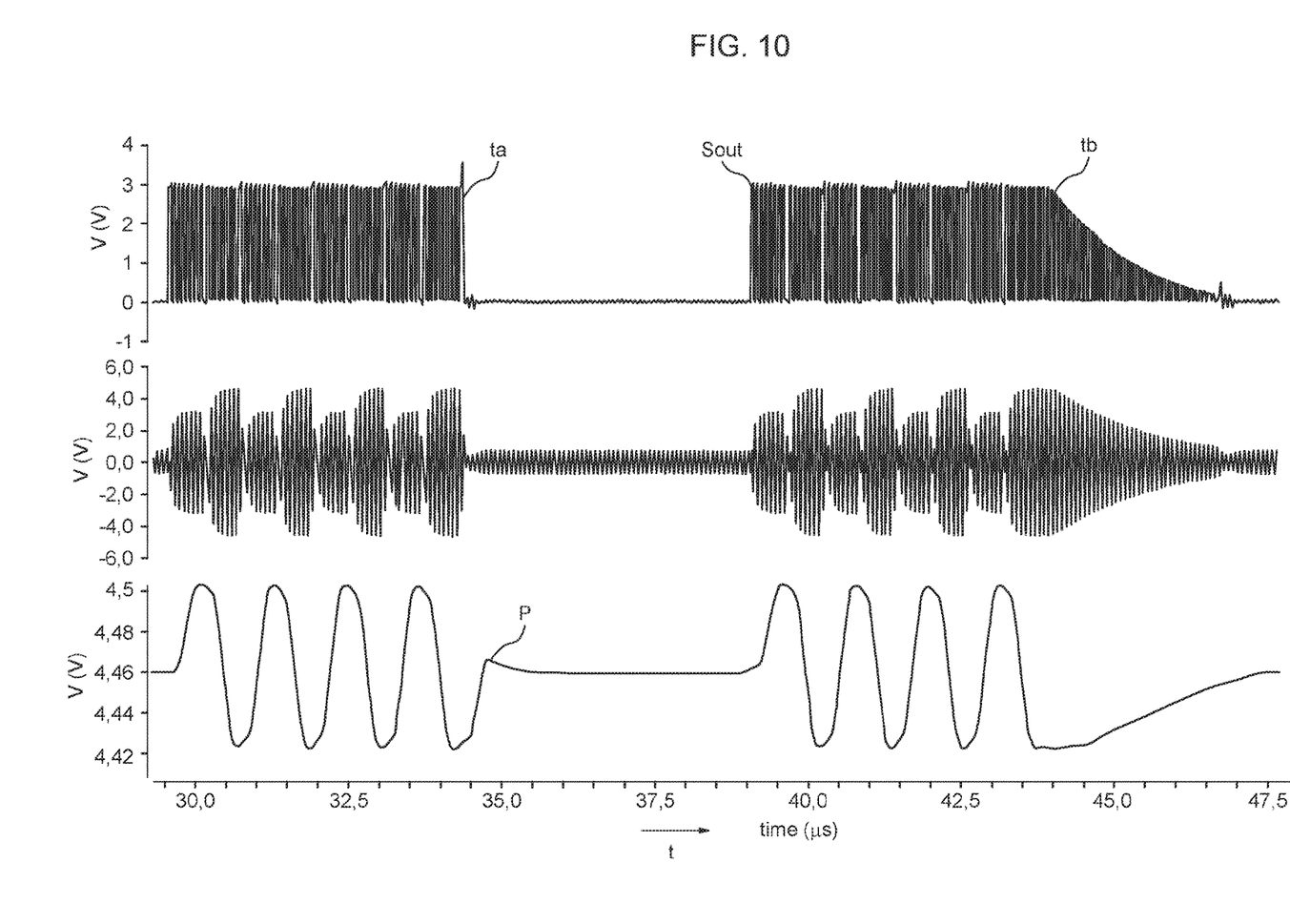
FIG. 10 shows signals of an RFID communication according to the embodiments of the present invention in a comparison with state of the art solutions.

FIG. 10 shows signals of an RFID communication according to the embodiments of the present invention in a comparison with state of the art solutions. On the left hand side, the signals produced in the state of the art are presented, whereas on the right hand side, the signals provided by a transponder having the proposed transmitter circuit are depicted.

The first line shows an RF driver signal on an ALM transponder on the left. On the right, the sending signal Sout is depicted. The second line shows the corresponding signal on the transponder antenna. The third line shows the analog signal as received by the reader device.

In first and second lines at point in time tb, the amplitude decay of the sending signal Sout and the signal at antenna can be clearly seen. As a consequence of the decaying, an additional impulse, like the impulse P on the left side in a state of the art implementation, is prohibited.

It is to be understood that any feature described in relation to any one embodiment may be used alone, or in combination with other features described, and may also be used in combination with one or more features of any other of the embodiments, or any combination of any other of the embodiments unless described as alternative. Furthermore, equivalents and modifications not described above may also be employed without departing from the scope of the invention which is defined in the accompanying claims.

REFERENCE LIST 10 reference potential terminal
11, 12, 13, 14, 15, 16 input/output
17, 18 control input Sc, Sd, Ssc, Sic, Smod signal
Sout, Sen, Sel signal
Sdctl, Sctl control signal
L antenna
MC matching circuit
RX receiver
TX transmitter
PLB PLL block
CTL control
E1, E2, E3 equipment
T transmitter circuit
Vref, Vreg, Vfb, Vc voltage
Drv driver
Cmp comparator
C1 decoupling capacitor
R1, R2, R3 resistor
T1, T2 transistor
t0, t1, t2, t3 point in time
ta, tb, tc point in time
Cc charging circuit
SW1, SW2 switch
P impulse

The invention claimed is:

1. A method for communication using active load modulation in a Radio Frequency Identification (RFID) system comprising the following steps:
receiving a carrier signal from a reader device, the carrier signal having a carrier frequency;
generating a modulated signal which is synchronous with the carrier signal,
transmitting a burst of a sending signal, wherein the sending signal is a function of a modulated signal, and
decaying the sending signal at an end of the burst by reducing a length of the sending signal by suppressing transmission of a last half period of the sending signal.

2. The method according to claim 1, wherein generating the modulated signal comprises digitally amplitude modulating a subcarrier signal and a data signal with a reproduced carrier signal.

3. The method of claim 2, wherein the data signal comprises data to be sent to the reader device, and wherein the subcarrier signal has a frequency which is an integer division of the carrier frequency.

4. The method of claim 2, wherein the reproduced carrier signal is synchronous in frequency and phase to the carrier signal.

5. The method according to claim 2, wherein transmitting the burst of the sending signal comprises emitting the modulated signal during a first half of a period of the subcarrier signal and emitting an inversed carrier signal during a second half of the period of the subcarrier signal, wherein a phase of the inversed carrier signal is inverse to a phase of the reproduced carrier signal.

6. The method according to claim 1, wherein the burst of the sending signal (Sout) comprises at least one bit of data.

7. The method according to claim 1, further comprising, after decaying the sending signal, not transmitting the sending signal for a period time.

8. A transmitter circuit for communication using active load modulation in a Radio Frequency Identification (RFID) system, wherein the transmitter circuit comprises:
a transmit driver circuit configured to transmit a burst of a sending signal, wherein the sending signal is a function of a modulated signal, and
a transmit control circuit configured to reduce a length of the sending signal by suppressing transmission of a last half period of the sending signal in order to decay the sending signal at an end of the burst.

9. A transmitter circuit for communication using active load modulation in a Radio Frequency Identification (RFID) system, comprising:
a transmit driver circuit configured to transmit a burst of a sending signal, wherein the sending signal is a function of a modulated signal, and
a circuit configured to decay the sending signal at an end of the burst, the circuit comprising:
a digital-to-analog converter configured to generate a reference voltage with a decaying amplitude; and
a regulator circuit that receives the decaying amplitude reference voltage and generates a decaying amplitude regulated voltage; and
wherein the transmit driver circuit transmitting the burst of the sending signal is powered by the decaying amplitude regulated voltage.

10. The transmitter circuit according to claim 9, wherein the regulator circuit comprises:
a first input receiving the reference voltage,
a second input receiving a supply voltage,
an output providing the decaying amplitude regulated voltage,
wherein a decoupling capacitor is connected to the output.

11. The transmitter circuit according to claim 10, further comprising:
a first transistor having a controlled section which is coupled between the second input and the output,
a comparator having a first input receiving the reference voltage, a second input receiving a feedback voltage dependent on the regulated voltage and an output providing a control voltage as a function of a difference between the reference voltage and the feedback voltage.

12. The transmitter circuit according to claim 11, further comprising:
a first switch which is coupled to a control input of the first transistor in order to connect either the output of the comparator or the second input of the regulator circuit to the control input of the first transistor,
wherein the first switch is controlled such that the first transistor is either switched on and the regulated voltage is supplied as a function of the reference voltage, or the first transistor is switched off and an amplitude of the regulated voltage decays according to an adjustable slope during an adjustable time.

13. The transmitter circuit according to claim 12, wherein the adjustable slope is adjustable as a function of the decoupling capacitor and an electrical load of the regulator circuit.

14. The transmitter circuit according to claim 12, wherein the regulator circuit further comprises a resistor divider having a serial connection of a first resistor and a second resistor, the resistor divider being coupled between the output of the regulator circuit and a reference potential terminal, and wherein the feedback voltage is provided at a connection point between the first resistor and the second resistor.

15. The transmitter circuit according to claim 12, wherein the regulator circuit further comprises a charging circuit coupled between the second input and the output of the regulator circuit, the charging circuit configured to recharge the output of the regulator circuit after completion of decaying of the sending signal.

16. The transmitter circuit according to claim 12, further comprising:

a second transistor,
a second switch, and
a resistor,
wherein the second transistor has a controlled section coupled between the second input and the output of the regulator circuit via the resistor,
wherein the second transistor further has a control input connected to the second switch,
wherein the second switch is configured to connect either the output of the comparator or the second input of the regulator circuit to the control input of the second transistor such that the second transistor is turned off concurrently with turning off the first transistor and the second transistor is turned on before turning on the first transistor.

* * * * *